United States Patent [19]

Morita et al.

[11] 4,126,282
[45] Nov. 21, 1978

[54] SEAT BELT RETRACTING AND WINDING DEVICE

[75] Inventors: Masayuki Morita, Tokoname; Takashi Kawaharazaki, Ichinomiya; Toshiaki Shimogawa, Nishio, all of Japan

[73] Assignee: Nippon Soken, Inc., Nishio, Japan

[21] Appl. No.: 809,633

[22] Filed: Jun. 24, 1977

[30] Foreign Application Priority Data

Jul. 6, 1976 [JP] Japan .............................. 51-89472[U]
Jul. 15, 1976 [JP] Japan .............................. 51-94128[U]

[51] Int. Cl.² ...................... A67B 35/02; B65H 75/48
[52] U.S. Cl. .............................. 242/107; 242/107.4 R
[58] Field of Search ............................ 242/107–107.7; 280/744–747; 297/388

[56] References Cited

U.S. PATENT DOCUMENTS 3,984,063  10/1976  Knieriemen ........................... 242/107
4,026,494  5/1977   Tanaka ................................. 242/107

Primary Examiner—Harvey C. Hornsby
Assistant Examiner—John M. Jillions
Attorney, Agent, or Firm—Cushman, Darby & Cushman

[57] ABSTRACT

A seat belt retracting and winding device is provided with a driving wheel rotatable in unison with a seat belt winding shaft, ratchet means consisting of a ratchet wheel and a catch, a cam disk and a catch holding disk adapted to maintain the catch in position in engagement with or disengagement from said ratchet wheel. Strong and weak springs are encased within the ratchet wheel and the driving wheel, respectively, and are interconnectable in series to each other. When the seat belt is paid out and fastened, the catch holding disk and the catch cooperate with each other to lock the ratchet wheel so that the strong spring is disconnected from the weak spring and consequently unpleasant restraining force on a driver or occupant may be reduced or relaxed. On the other hand when the seat belt is unfastened, the rotation of the winding shaft in the opposite direction causes the cam disk and the catch holding disk to cooperate with each other so as to release said locked ratchet wheel for free rotation so that the strong spring is drivingly coupled to the weak spring and consequently the positive and complete retraction of the seat belt may be ensured.

7 Claims, 10 Drawing Figures

SEAT BELT RETRACTING AND WINDING DEVICE

BACKGROUND OF THE INVENTION

1. Field of the Invention

The present invention relates to generally a device for automatically retracting and winding a seat belt, and more particularly to such a device comprising a mechanism for controlling the winding and rewinding force imparted to the seat belt, thereby permitting the free but safe movement of a driver or an occupant without causing any excessive unpleasant feeling even when the seat belt is fastened, and ensuring the positive retraction of the seat belt when the latter is unfastened.

2. Brief Description of the Prior Art

In general, the prior art seat belt retracting and winding devices or retractors are provided with spiral spring means having its one end anchored to the shaft of a winding reel and its the other end securely attached to the main body or frame of the retractor in order to retract the seat belt and rewind it around the winding reel or shaft, and in order to relax the restraining force on a driver or an occupant an attempt has been made to reduce the force of the spring means, but the result was disadvantageous in that the seat belt could not be completely retracted and wound around the winding reel when the seat belt was unfastened.

In order to solve this problem, we had already proposed an improved seat belt retracting and winding device in our previous patent application, Ser. No. 787,534 which is a continuation of Ser. No. 656,850, filed on Feb. 10, 1976, now abandoned but we found out that some improvements on this device were required from the standpoint of assembly thereof.

SUMMARY OF THE INVENTION

Accordingly it is a primary object of the present invention to provide a further improved seat belt retracting and winding device which may substantially solve the aforementioned problem encountered in the conventional devices of the type described above and in which a reduced but safeguarded retracting or tightening force may be exerted to the seat belt when the latter has been fastened while an increasing retracting force is exerted thereto once the seat belt is unfastened.

It is another object of the present invention to provide a seat belt retracting and winding device of the type described which may be assembled in a simpler manner.

It is a further object of the present invention to provide a seat belt retracting and winding device of the type described which is provided with a novel mechanism formed separately from and firmly secured to the seat belt winding reel or shaft for automatically and selectively generating a strong or weak spring force and hence a strong or weak retracting or tightening force on the seat belt.

Therefore according to the present invention the conventional seat belt retracting and winding devices presently available in the market may be easily modified to improve their construction as described above.

Briefly stated, to the above and other ends, the present invention provides a seat belt retracting and winding device comprising a frame, a winding reel having a shaft, a seat belt wound on said winding reel with the inner end being fixed to said reel, and seat belt retracting means including means for controlling the fastening force of said seat belt, wherein said seat belt retracting means comprises a housing fixed to said frame, a driving wheel rotatable in relation with the rotation of said shaft, a ratchet wheel rotatably carried on said shaft, a catch engageable with said ratchet wheel, a first spring having one end fixed to said ratchet wheel and the other end fixed to said housing, a second spring having one end fixed to said driving wheel and the other end fixed to said ratchet wheel, cam means with a cam portion, said cam means being selectively driven by said driving wheel in such a manner that when the seat belt is paid out, said cam portion is brought to a predetermined position and remains stationary at this position, and when the seat belt is retracted, said cam portion is brought to engage said catch to thereby disengage the latter from said ratchet wheel after a predetermined angular movement, and catch holding means driven by said driving wheel and being rotatable in a predetermined angular range relative to said housing to control the engagement of said catch with said ratchet wheel in such a manner that when said seat belt is retracted by a predetermined length, said catch engages said ratchet wheel to thereby lock the latter, and when said seat belt is further retracted, said catch is kept disengaged from said ratchet wheel to thereby permit the rotation thereof until said seat belt is completely retracted.

The above and other objects, features and advantages of the present invention will become more apparent from the following description of some preferred embodiments thereof taken in conjunction with the accompanying drawings.

BRIEF DESCRIPTION OF THE DRAWINGS

Same reference numerals are used to designate similar parts throughout the figures.

DESCRIPTION OF THE PREFERRED EMBODIMENTS

Figure 1:
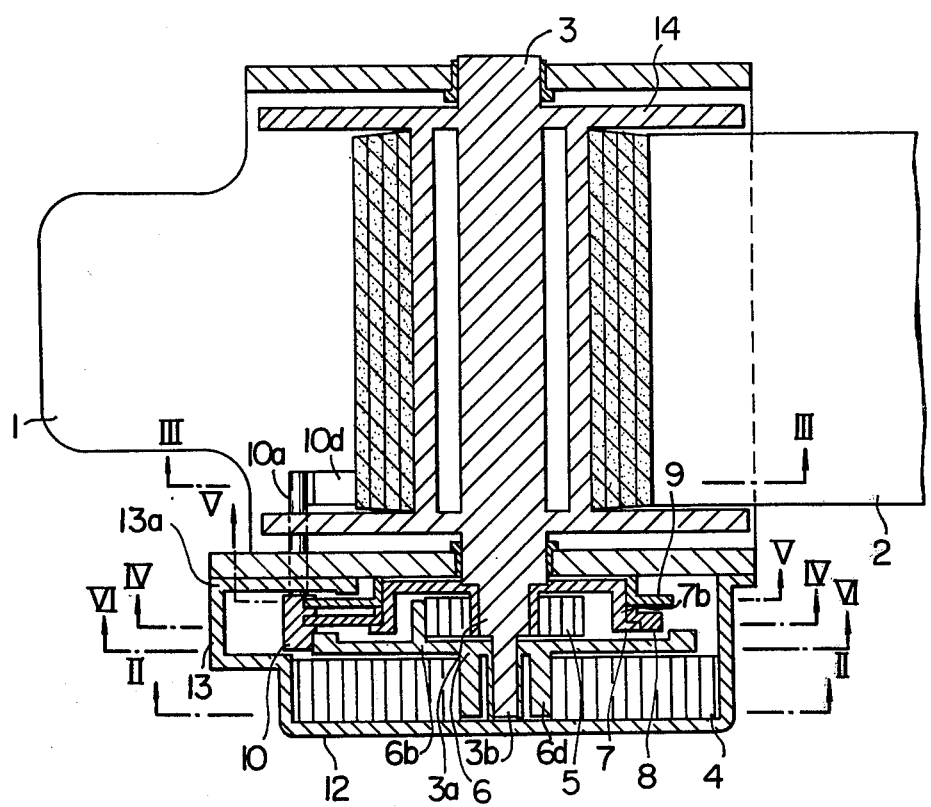
FIG. 1 is a vertical sectional view of one preferred embodiment of a seat belt retracting and winding device in accordance with the present invention.

Referring to FIGS. 1 through 5, a seat belt retracting and winding device in accordance with the present invention has a main body or frame 1 so formed as to rotatably mount a winding reel 14 therein and to permit the mounting of various parts to be described below. The winding reel 14 has a winding shaft 3 to be described in detail hereinafter. A seat belt 2 for restraining a driver or occupant has its one end securely anchored to the winding shaft 3, is wrapped therearound a suitable number of turns and has its the other end connected through a slip joint (not shown) to an anchor (not shown).

The winding shaft 3 which is rotatably journalled in the main body or frame 1 has a section 3a (See FIG. 4), which is nearly rectangular in cross section and formed at one end portion of the shaft 3 (a lower portion in FIG. 1) for attachment of a driving wheel 7 to be described in detail hereinafter. Furthermore, the winding shaft 3 has a reduced diameter section 3b axially outwardly of the section 3a, and the section 3b is adapted to rotatably carry a ratchet gear 6 to be described in detail hereinafter.

Figure 2:
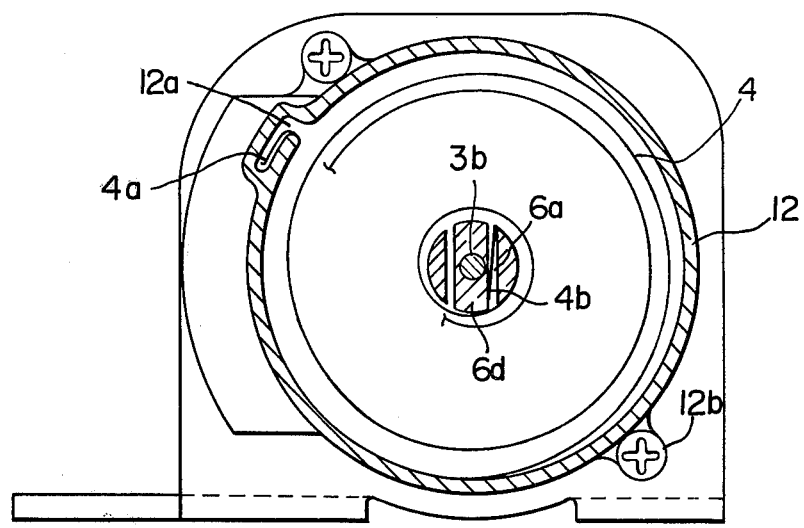
FIG. 2 is a sectional view thereof taken along the line II — II of FIG. 1.
Figure 4:
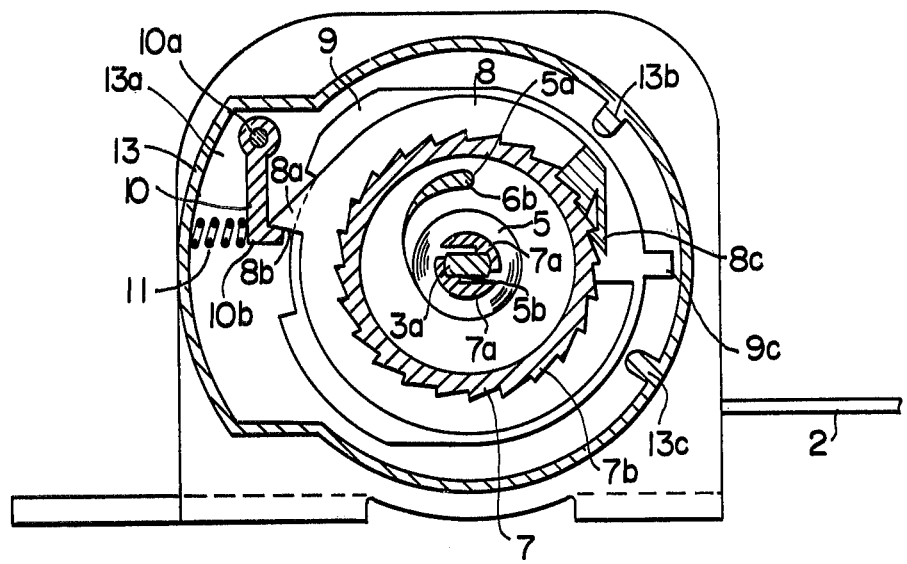
FIG. 4 is a sectional view taken along the line IV — IV of FIG. 1.

As best shown in FIG. 2, a first spring 4, which is encased within a housing 12 to be described in more detail hereinafter, has its outer end secured to the main body 1 by a hook or spring retaining pawl 12a of the housing 12 and has its inner end 4b securely retained in a slit 6a of the ratchet gear 6. As best shown in FIG. 4, a second spring 5, which is disposed within the ratchet gear 6 and whose spring force and length are both smaller than those of the first spring 4, has its outer end 5a securely retained in position by a spring retaining hook 6b of the ratchet gear 6 and its inner end 5b securely retained in position between the section 3a of the winding shaft 3 and a mounting portion or part 7a of the driving wheel 7.

Thus the first and second springs 4 and 5 are connected in series through the ratchet gear 6 to make up a spring assembly with one end securely anchored to the winding shaft 3 and the other end securely fixed to the main body 1 through the housing 12 in the manner described above. The first and second springs 4 and 5 function as one-piece spring when the ratchet gear 6 is permitted to freely rotate, thereby imparting the winding force to the seat belt 2.

Figure 6:
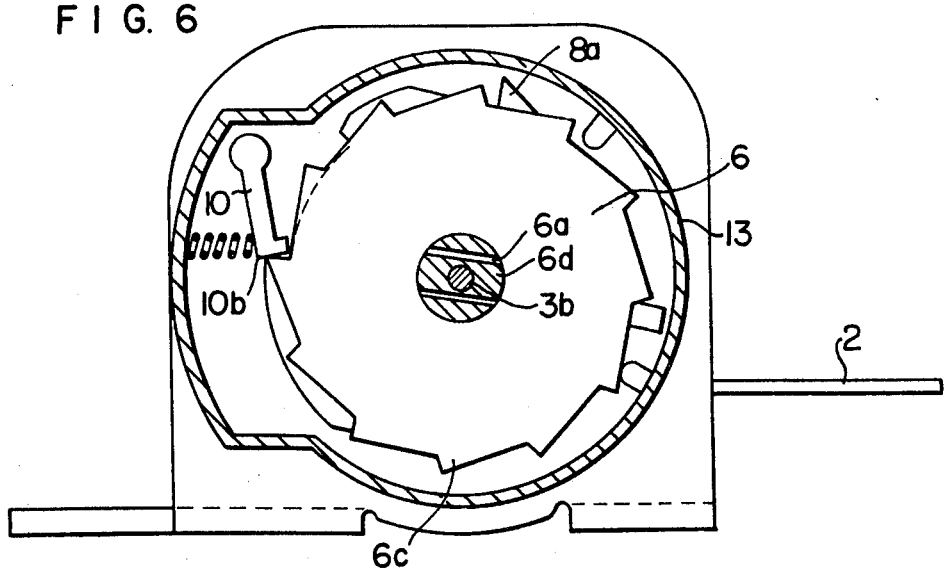
FIGS. 6, 7 and 8 are sectional views taken along the line VI — VI of FIG. 1.

Referring to FIG. 6, the ratchet gear 6 which is rotatably mounted on the reduced-diameter portion 3b of the winding shaft and connect in series the first and second springs 4 and 5, has in addition to the slit 6a and the spring retaining hook 6b, ratchet teeth 6c for intermittent engagement with a detent, click or catch 10 for rotation only in one direction (Hence, the ratchet gear or wheel 6 is sometimes referred to as "a one-way or unidirectional ratchet wheel" in this specification), and a mounting part or portion 6d (See FIG. 1) with which the ratchet gear 6 is rotatably mounted on the winding shaft 3.

The driving wheel 7 is securely fitted over the section 3a of the winding shaft 3 for rotation in unison therewith, encases therein the second spring 5 in the manner described above, carries coaxially a cam disk 8 and a catch or ratchet holding or retaining disk 9 to be described in detail hereinafter, and, in addition to the mounting portion 7a described above, has a one-way or unidirectional ratchet wheel 7b engageable with a pawl 8c of the cam disk 8 for rotation in unison therewith only in case of the rotation in the clockwise direction in FIG. 4 in which the seat belt 2 is wound up. Thus the driving wheel 7 and the cam disk or wheel 8 constitute a one-way or nonreversible clutch.

The cam disk 8 which is securely fitted over the outer periphery of the driving wheel 7 coaxially thereof has, in addition to the pawl 8c, a cam portion 8a (See FIG. 4) circumferentially outwardly extending for engagement with the catch 10 and a stop or stepped portion 8b contiguous to the cam portion 8a for engagement with the catch 10 for restraining the cam disk 8 from the rotation in the counterclockwise direction (in FIG. 4) in which the seat belt 2 is unwound. Thus the cam disk 8 rotates in unison with the driving wheel 7 when the latter rotates in the clockwise direction, but rotates freely or does not rotate in unison with the driving wheel 7 when the latter rotates in the counterclockwise direction.

Figure 5:
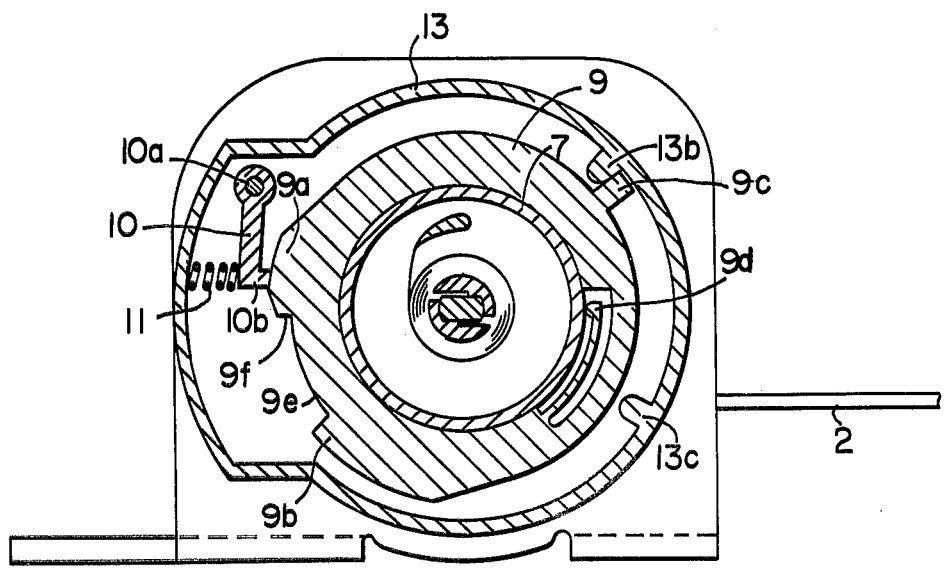
FIG. 5 is a sectional view taken along the line V — V of FIG. 1.

As best shown in FIG. 5, the catch holding disk 9 which is coaxially rotatably mounted on the outer periphery of the driving wheel 7 has a first ridge 9a and a second ridge 9b both of which extend radially outwardly for selective engagement with a pawl 10b of the catch 10 for maintaining the unwinding and winding operations, respectively, as will be described in detail hereinafter and a radially inwardly recessed portion or valley 9e between the first and second ridges 9a and 9b, a radially outwardly extending projection 9c for selective engagement with radially inwardly extending first and second projections or stops 13b and 13c of a second housing 13 to be described in detail hereinafter, and a spring 9d formed integral with the catch holding disk 9 and extending circumferentially along the interior periphery thereof for engagement with the exterior periphery of the driving wheel 7 so that the catch holding disk 9 may rotate in unison therewith. However the angle of rotation of the catch holding disk 9 is prevented, as will be described in more detail hereinafter, during the rotation of the disk 9 in unison with the winding shaft 3 when the first or second ridge 9a or 9b engages the pawl 10b of the catch 10 and when the projection 9c engages either of the first and second stops 13b and 13c of the housing 13.

Figure 8:
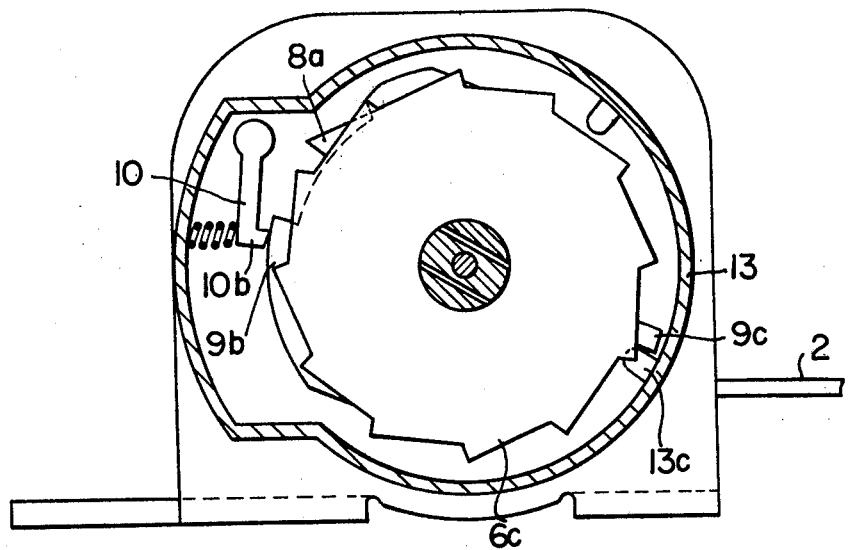

Referring to FIG. 4, the catch 10 has its one end terminated into a pivot pin 10a rotataby supported by a journal portion 13a of the second housing 13 and its the other end terminated into the pawl 10b for engagement with the ratchet teeth 6c (See FIG. 6), the cam portion 8a of the cam disk 8 and the first and second ridges 9a and 9b of the catch holding disk 9 (See FIGS. 6 and 8). For this purpose, the width (in the axial direction) of the pawl 10b must be suitably selected.

The radial heights or distances between the axis of rotation of the winding shaft 3 and the most outwardly radially extending points of the teeth 6c of the ratchet wheel 6, the cam portion 8a of the cam disk 8 and the first and second ridges 9a and 9b of the catch holding disk 9 are so selected as to satisfy the following conditions:

cam portion 8a > first and second ridges 9a and 9b > teeth 6c of ratchet wheel 6

Figure 3:
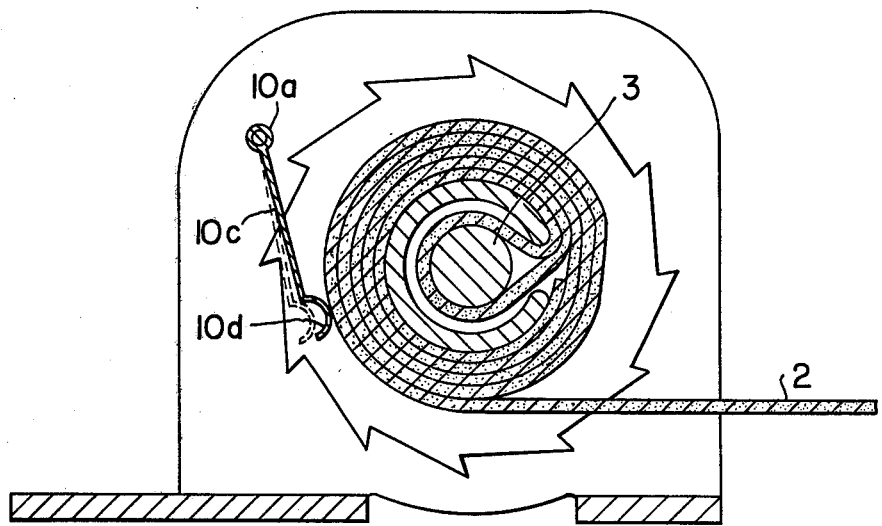
FIG. 3 is a sectional view taken along the line III — III of FIG. 1.

Referring to FIG. 1, the pivot pin portion 10a of the catch 10 extends axially inwardly through the bearing portion 13a of the housing 13 and the side wall of the main body or frame 1, and, as best shown in FIG. 3, a contact arm 10c has its one or upper end securely fixed to the free end of the pivot pin portion 10a and its the other end terminated into a semicircular contact portion 10d for engagement with the seat belt 2. The contact portion 10d starts its engagement with the seat belt 2 when the contact arm 10c is in the position indicated by the solid lines in FIG. 3. This position corresponds to the rearmost position of a seat with the seat belt 2 unwound and extended to retain a driver or occupant sitting on the seat in the rearmost position. Therefore, when the seat belt is wound up, its diameter on the winding shaft 3 is increased so that the contact arm 10c is gradually displaced to the position indicated by the broken lines in FIG. 3 and consequently the catch 10 is caused to rotate in the clockwise direction away from the cam disk 8, the catch holding disk 9 and the ratchet gear 6. More particularly the position indicated by the solid lines in FIG. 3 of the contact arm 10c corresponds to a point e in FIG. 10. When the diameter of the seat belt wrapped around the winding shaft 3 is greater than that shown in FIG. 3, i.e. when the length of the seat belt extended or unwound is shorter than the length indicated at the point e in FIG. 10, the catch 10 is held in the inoperative position.

Referring to FIGS. 4 and 5, a return spring 11 of the catch 10 is loaded between the interior surface of the housing 13 and a point adjacent to the pawl 10b of the catch 10 for normally biasing the catch in the counterclockwise direction.

Referring to FIG. 2, the housing or casing 12 encases therein the first spring 4 in the manner described above, and, in addition to the spring retaining hook 12a, has mounting means 12b for attachment to the main body or frame 1.

Referring to FIG. 1, the housing or casing 13 encases therein the ratchet gear 6, the driving wheel 7, the cam disk 8, the catch holding disk 9 and the catch 10, and is mounted with screws or the like together with the housing or casing 12 to the main body 1.

Next the mode of operation of the above embodiment will be described. First referring to FIG. 4, the mode of unwinding the seat belt 2 for restraining a driver or an occupant will be described. As the seat belt is unwound, the winding shaft 3 is rotated in the counterclockwise direction and the driving wheel 7 is also rotated in the same direction so that the cam disk 8 and the catch holding disk 9 carried by the driving wheel 7 rotate in the same direction if the catch 10 or the first and second stops 13b and 13c of the housing 13 do not prevent their rotation. Upon engagement of the stop 8b of the cam disk 8 with the pawl 10b of the catch 10, the pawl 8c of the cam disk 8 does not engage with the teeth 7b of the driving wheel, slides over them and is stopped at the position shown in FIG. 4. Upon engagement of the shoulder 9f of the first ridge 9a of the disk 9 with the pawl 10b of the catch 10, the rotation of the disk 9 is stopped. When the seat belt 2 is further unwound so that the tooth 6c of the ratchet gear 6 pushes the pawl 10b outwardly, the pawl 10b is released from the first ridge 9a of the disk 9 so that the latter is permitted to rotate again, but upon engagement of the projection 9c of the disk 9 with the first stopper 13b of the housing 13, the disk 9 is stopped (See FIG. 5), while the driving wheel 7 is rotating. Under these conditions the first ridge 9a of the disk 9 keeps the pawl 10b of the catch 10 away from the teeth 6c of the ratchet gear 6, no contact noise is generated even when the ratchet gear 6 keeps rotating. The seat belt 2 is unwound in the manner described above, and is fastened to restrain the driver or occupant in a manner well known in the art. In this case, however, the seat belt 2 is unwound, in general, a length greater than a length required to securely restrain the driver or occupant so that the seat belt 2 must be rewound.

Referring to FIG. 5, in order to rewind the seat belt 2, the driving wheel 7 rotates in the clockwise direction so that the cam disk 8 and the catch holding disk 9 are rotated in unison with the driving wheel 7 (See FIG. 4) in the same direction as they are not restrained. As a result, the pawl 10b of the catch 10 rides past the first ridge 9a of the disk 9 and drops into the recessed portion 9e so that the pawl 10 engages with the teeth 6c of the ratchet gear 6 as shown in FIG. 6. As a consequence the rotation in the clockwise direction of the ratchet gear 6 is restricted so that the first spring having its inner end anchored to the ratchet gear 6 is locked. As a result, only the second spring 5 imparts the turning torque to the winding shaft 3. (This transition is indicated from the point a to the point b in FIG. 10).

The seat belt winding force is, therefore, decreased so that the restraining force acting on the driver or occupant is reduced accordingly. Thus the fastening of the seat belt is completed (this condition falls within the range from the points b to c in FIG. 10). That is, the seat belt 2 is extended or retracted within this range as the driver or occupant moves about on the seat for access to a cigarette lighter or radio.

Figure 7:
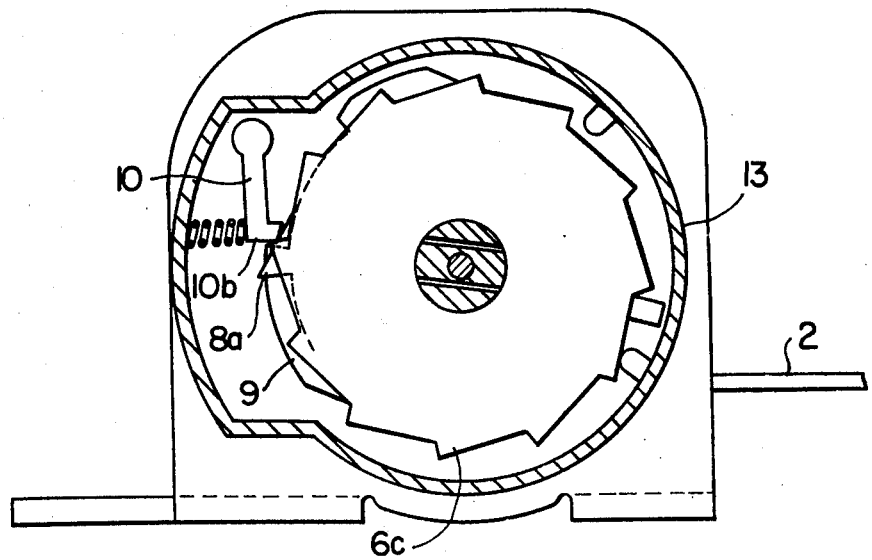

Next the mode of retracting and winding the seat belt 2 will be described when the driver or occupant unfastens it. When the seat belt 2 is fastened, the cam portion 8a of the cam disk 8 is at the position in FIG. 6. When the seat belt 2 is unfastened, the second spring 5 unwinds itself to retract and winding the seat belt around the winding shaft 3. Then the cam pawl 8c of the cam disk 8 engages with the teeth of the ratchet wheel 7b of the driving wheel 7 (See FIG. 4) so that the cam disk 8 starts rotation in unison with the winding shaft 3, and at the position shown in FIG. 7, the cam portion 8a of the cam disk 8 pushes the pawl 10b of the ratchet 10 upwardly. Since the pawl 10b is in engagement with the teeth 6c of the ratchet gear 6, the first spring 4 imparts the turning torque to the catch 10, but the engagement of the cam pawl 8c with the teeth of the ratchet wheel 7b causes the cam portion 8a to overcome this turning torque so as to push the catch 10 upward. Further rotation of the cam disk 8 causes the disengagement of the pawl 10b from the teeth 6c of the ratchet gear 6 as shown in FIG. 8. As a result, the second spring 5 which has been unwinding itself is caused by the first spring 4 which is stronger than the second spring 5 to quickly wind itself due to the balance of the forces of both springs, so that the winding force imparted to the seat belt 2 is increased. (This transition is indicated from the point c to the point d in FIG. 10). Meanwhile the catch holding disk 9 rotates together with the cam disk 8 in the clockwise direction, and when the cam disk 8 has completely pushed the pawl 10b of the catch 10, the second ridge 9b engages with the pawl 10b as shown in FIG. 8 so that the pawl 10b does not engage with the teeth 6c of the ratchet gear 6 and consequently the free rotation in the clockwise direction of the ratchet gear 6 is permitted.

Since the free rotation of the ratchet gear 6 is not restrained as described above, the greater winding force is imparted to wind the seat belt. When the diameter of the seat belt wrapped around the winding shaft 3 increases so that the contact portion 10d of the contact arm 10c is made into contact with the seat belt as shown in FIG. 3 (corresponding to the point e in FIG. 10), the catch 10 is now retained in its inoperative position by the contact arm 10c rather than by the second ridge 9b of the disk 9. The catch 10 is completely freed from the cam disk 8 and the catch holding disk 9, and under these conditions even if the seat belt should be temporarily unwound, the positive winding operation may be ensured because the greater winding force is imparted to the seat belt.

It sometimes occurs that the winding shaft is caused to rotate through beyond 360° after the driver or occupant has fastened the seat belt because he moves his body over a relatively wide range in order to operate, for instance, a door regulator handle on the opposite side. The driving wheel 7 is caused to rotate in the counterclockwise direction as the seat belt 2 is unwound and extended, the cam disk 8 is also caused to rotate from the position shown in FIG. 6 because of some frictional resistance between the disk 8 and the wheel 7 to the position shown in FIG. 4 where the cam stop 8b engages with the pawl 10b of the catch 10 so that the further rotation of the cam disk 8 is restrained. When the winding shaft 3 rotates through in excess of 360° to retract and wind the seat belt as the driver or occupant resumes his normal position, the cam portion 8a of the cam disk 8 releases the ratchet gear 6 from its locked position as shown in FIG. 8 so that the greater seat belt rewinding force is produced even though the seat belt 2 is fastened. When the driver or occupant moves his body, the seat belt 2 is unwound and extended so that both the cam disk 8 and the catch holding disk 9 are caused to rotate in the counterclockwise direction from the position shown in FIG. 8 to the position shown in FIG. 4, and if the seat belt 2 is further unwound and extended, the catch 10 engages with the ratchet gear 6 as shown in FIG. 6 so that the seat belt winding force is reduced and the restraining force on the driver or occupant is decreased accordingly.

Figure 10:
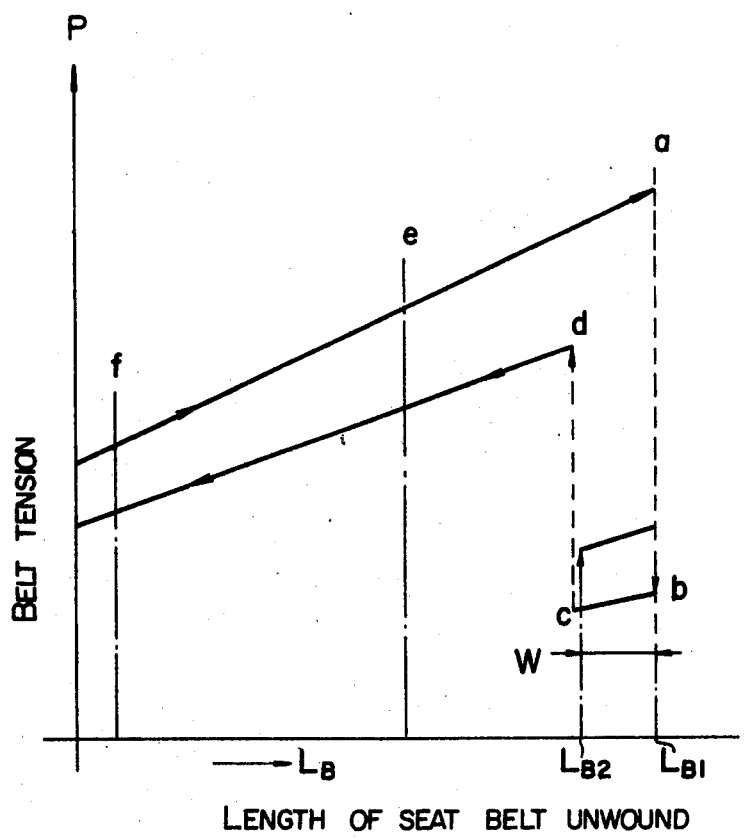
FIG. 10 shows a graph used for the explanation of the operational characteristics of the seat belt retracting and winding device shown in FIGS. 1 through 8.

Next the mode of operation will be described further in particular reference to FIG. 10, wherein the belt tension P is plotted along the ordinate whereas the length $L_B$ of the seat belt unwound and extended is plotted along the abscissa. The point e corresponds to the position of the contact arm 10c starting to engage with the seat belt 2 as described above. The range W indicates that the belt tension is reduced or relaxed in this range; $L_{B1}$ indicates the length of the seat belt extended when the driving coupling between the first and second springs is disconnected; and $L_{B2}$ indicates the length of the seat belt unwound and extended when the first and second springs are operatively interconnected to each other.

It is seen that in response to the rotation of the winding shaft 3 through within 360° for rewinding the seat belt 2 after it has been extended over a desired length, the seat belt winding force is decreased to a lower level so that the restraining force on the driver or occupant may be reduced or relaxed accordingly. On the other hand, when the winding shaft 3 rotates through in excess of 360°, the seat belt winding force is increased to a higher level, and once the diameter of the seat belt 2 wrapped around the winding shaft 3 has exceeded a predetermined diameter, the seat belt winding force is increased to and maintained at a higher level regardless of the seat belt unwinding or winding operation so that the positive retraction and winding of the seat belt over the winding shaft 3 may be ensured.

Figure 9:
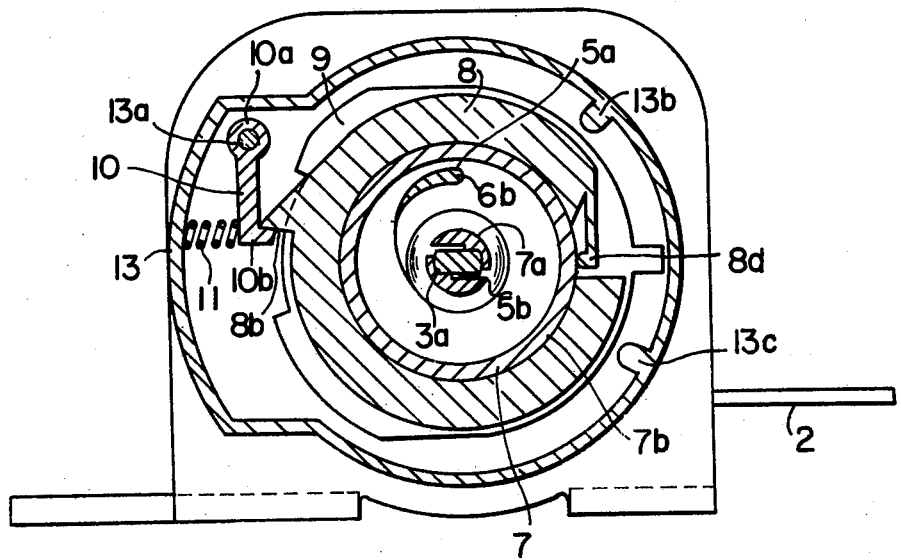
FIG. 9 is a sectional view similar to FIG. 4 but illustrating a modification of the interconnection between a cam disk and a driving wheel.

In FIG. 9 there is shown a modification of the operative interconnection between the cam disk 8 and the driving wheel 7. The cam disk is substantially similar in construction to that described hereinbefoe except that instead of the cam pawl 8c (See FIG. 4) for engagement with the teeth of the ratchet wheel 7b, a spring 8d is formed integrally with the cam disk 8 for engagement with the outer periphery of the driving wheel 7 so that the cam disk 8 may rotate in unison with the driving wheel 7 and hence the winding shaft 3 in the counterclockwise direction unless the catch 10 engages with the stop 8b.

So far the pawl 8c or spring 8d of the disk 8 which engages with the teeth of the ratchet wheel 7b of the driving wheel 7 or is made into frictional engagement with the outer periphery thereof so that the cam disk 8 may rotate in unison with the driving wheel 7 only in the clockwise direction, has been described as being formed integrally with the disk 8, but when it is difficult to form the pawl 8c or spring 8d integrally with the cam disk 8, a separately fabricated spring member may be suitably attached to the disk 8. Furthermore, in place of the second ridge 9b of the catch holding disk 9 for keeping the catch 10 away from the engagement with the ratchet gear 6, a similar ridge may be formed adjacent to the stop portion 8b of the cam disk 8 so that such a ridge may keep the catch 10 away from the engagement with the ratchet gear 6. Moreover the second spring 5 may be a helical spring made of a kind of wire.

Instead of making the contact arm 10c made of a rigid material, it may be made of an elastic material capable of being curved so that it never causes the pawl 10b to disengage from the teeth of the ratchet gear 6, and such disengagement is caused by the cam disk 8 without fail.

Instead of the ratchet 10, any other suitable means such as other latching means or friction engagement means may be used for operatively interconnecting and disconnecting the first and second springs in the manner described above.

The driving wheel 7 has been described as being directly coupled to the winding shaft 3, but it is to be understood that they may be operatively interconnected with each other through gears so that the driving wheel 7 may be rotated at a speed different from the speed of the winding shaft 3 and in the direction opposite to the direction of rotation thereof.

What we claim is:

1. A seat belt retracting and winding device comprising a frame, a winding reel having a shaft, a seat belt wound on said winding reel with the inner end being fixed to said reel, a housing fixed to said frame, and seat belt retracting means disposed in said housing and including means for controlling the retracting force of said seat belt, wherein said seat belt retracting means comprises:

a driving wheel rotatable with the rotation of said shaft, a ratchet wheel rotatably carried on said shaft, a catch engageable with said ratchet wheel, a first spring having one end fixed to said ratchet wheel and the other end fixed to said housing, a second spring having one end fixed to said driving wheel and the other end fixed to said ratchet wheel, cam means with a cam portion, said cam means being selectively driven by said driving wheel in such a manner that when the seat belt is paid out, said cam portion is brought to a predetermined position and remains stationary at this position, and when the seat belt is retracted, said cam portion is brought to engage said catch to thereby disengage the latter from said ratchet wheel after a predetermined angular movement, and catch holding means driven by said driving wheel and being rotatable in a predetermined angular range relative to said housing to control the engagement of said catch with said ratchet wheel in such a manner that when said seat belt is retracted by a predetermined length after it has been paid out to be fastened, said catch engages said ratchet wheel to thereby lock the latter, and when said seat belt is further retracted, said catch is disengaged from said ratchet wheel by said cam portion and is kept disengaged therefrom to thereby permit the rotation thereof until said seat belt is completely retracted.

2. A seat belt retracting and winding device comprising a frame, a winding reel having a shaft, a seat belt wound on said winding reel with the inner end being fixed to said reel, a housing fixed to said frame, and seat belt retracting means disposed in said housing and including means for controlling the retracting force of said seat belt, wherein said seat belt retracting means comprises:
- a driving wheel disposed in said housing and carried on said shaft for rotation in unison therewith,
- a ratchet wheel disposed within said housing and rotatably carried on said shaft,
- a catch engageable with said ratchet wheel,
- a first spring having one end connected to said ratchet wheel and the other end connected to said housing,
- a second spring having one end connected to said driving wheel and the other end connected to said ratchet wheel,
- a cam disk with a cam portion carried on said driving wheel and adapted to be selectively driven in such a manner that when the seat belt is paid out said cam portion is brought to a predetermined position and remains stationary at this position and when the seat belt is retracted said cam portion is brought to engage said catch to thereby disengage the latter from said ratchet wheel after a predetermined angular movement, and
- holding means adapted to be driven by said driving wheel for rotation in a predetermined angular range relative to said housing so as to control the engagement of said catch with said ratchet wheel in such a manner that when said seat belt is retracted by a predetermined length after it has been paid out to be fastened, said catch engages said ratchet wheel to thereby lock the latter, and when said seat belt is further retracted, said catch is disengaged from said ratchet wheel by said cam portion and is kept disengaged therefrom to thereby permit the free rotation thereof until said seat belt is completely retracted.

3. A seat belt retracting and winding device as set forth in claim 2 wherein
said driving wheel comprises a ratchet wheel having a plurality of teeth formed around the outer periphery thereof, and
said cam disk includes at least one pawl for engagement with said teeth of said ratchet wheel.

4. A seat belt retracting and winding device as set forth in claim 2 wherein
said holding means is formed around the outer periphery thereof with a first ridge for engagement with said catch so as to keep the latter disengaged from said ratchet wheel and a recessed portion contiguous to said first ridge so that when said catch drops in said recessed portion, said catch is caused to engage said ratchet wheel.

5. A seat belt retracting and winding device as set forth in claim 4 wherein
said holding means is further formed with a second ridge contiguous to said recessed portion at one end thereof remote from said first ridge for engagement with said catch so as to cause the latter to be disengaged from said ratchet wheel.

6. A seat belt retracting and winding device as set forth in claim 2 wherein
said cam disk includes at least one spring for frictional engagement with the outer periphery of said driving wheel so that said cam disk may rotate in unison with said driving wheel.

7. A seat belt retracting and winding device as set forth in claim 2 wherein
sensing means operatively coupled to said catch for engaging the seat belt wrapped around said winding shaft for sensing the length of the seat belt wound on said reel to move said catch out of engagement with said cam disk, ratchet wheel and catch holding means at a predetermined length of belt wound on said reel.

* * * * *